US012634107B1

(12) United States Patent    (10) Patent No.:   US 12,634,107 B1

Zhang et al.    (45) Date of Patent:    May 19, 2026

(54) OPTICAL FREQUENCY COMB BASED COHERENT PHASE RECOVERY SIMPLIFICATION

(71) Applicant: CABLE TELEVISION LABORATORIES, INC., Louisville, CO (US)

(72) Inventors: Haipeng Zhang, Broomfield, CO (US); Luis Alberto Campos, Superior, CO (US); Junwen Zhang, Broomfield, CO (US); Mu Xu, Shoreline, WA (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 299 days.

(21) Appl. No.: 18/241,738

(22) Filed: Sep. 1, 2023

Related U.S. Application Data

(63) Continuation of application No. 17/225,067, filed on Apr. 7, 2021, now Pat. No. 11,750,357.

(60) Provisional application No. 63/006,200, filed on Apr. 7, 2020.

(51) Int. Cl.
   *H04B 10/61*      (2013.01)
   *H04L 7/00*       (2006.01)

(52) U.S. Cl.
   CPC ........... *H04L 7/0075* (2013.01); *H04B 10/61* (2013.01); *H04B 10/6165* (2013.01)

(58) Field of Classification Search
   None
   See application file for complete search history.

(56) References Cited

U.S. PATENT DOCUMENTS

| | | |
|---|---|---|
| 10,200,144 B1 | 2/2019 | Chowdhury et al. |
| 2005/0018724 A1 | 1/2005 | Silva et al. |
| 2008/0145063 A1* | 6/2008 | Li ........................... H04B 10/40 |
| | | 398/140 |
| 2010/0178057 A1* | 7/2010 | Shieh .................. H04L 25/0242 |
| | | 398/79 |
| 2011/0150504 A1* | 6/2011 | Ellis ....................... H04B 10/60 |
| | | 398/203 |
| 2014/0233957 A1* | 8/2014 | Watanabe ............ H04B 10/506 |
| | | 398/91 |
| 2015/0222356 A1* | 8/2015 | Kawanishi .............. H04J 14/06 |
| | | 398/43 |

(Continued)

OTHER PUBLICATIONS

Torres-Company et al: "Laser Frequency Combs for Coherent Optical Communications," Journal of Lightwave Technology, vol. 37, No. 7, Apr. 1, 2019, pp. 1663-1670 (Year: 2019).

*Primary Examiner* — Li Liu

(74) *Attorney, Agent, or Firm* — PdZ Patent Law, PLLC

(57) ABSTRACT

Coherent phase recovery method includes producing, with a transmit-side frequency-comb source, a first frequency-comb signal that includes a pilot tone and a first optical tone having a first center wavelength that differs from a pilot center wavelength of the pilot tone. The method also includes coherently modulating the first optical tone to yield a first modulated signal; and generating a second frequency-comb signal with a receive-side frequency-comb source driven by the pilot tone. The method also includes extracting, from the second frequency-comb signal, a first local-oscillator tone having the first center wavelength; and demodulating the first modulated signal by homodyning the first modulated signal with the first local-oscillator tone.

19 Claims, 7 Drawing Sheets

(56) References Cited

U.S. PATENT DOCUMENTS

| | | | |
|---|---|---|---|
| 2016/0065313 A1 | 3/2016 | Yu et al. | |
| 2016/0285582 A1* | 9/2016 | Kato et al. | |
| 2017/0033870 A1* | 2/2017 | Dangui | H04J 14/0279 |
| 2018/0083599 A1* | 3/2018 | Kippenberg | H04J 14/02 |
| 2018/0097567 A1* | 4/2018 | LeGrange | H04B 10/293 |
| 2018/0131447 A1* | 5/2018 | Soares | H04B 10/614 |
| 2019/0031447 A1 | 1/2019 | Galimberti et al. | |
| 2019/0372589 A1 | 12/2019 | Gould et al. | |

* cited by examiner

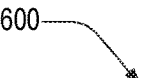

610
Produce, with a frequency comb source, a frequency-comb signal that includes a pilot tone and a first optical tone differing in center wavelength from the pilot tone.

620
Coherently modulate the first optical tone to yield a first modulated signal.

630
Interferometrically detect the pilot tone to yield a pilot beat signal.

640
Coherently detect the first modulated signal to yield a first demodulated signal.

650
Determine a noise-corrected phase signal from a difference between the first demodulated signal and the pilot beat signal.

652
Determine the noise-corrected phase signal as a phase of the difference between the first demodulated signal and the pilot beat signal.

654
Execute a blind phase search algorithm to determine the phase of the difference between the first demodulated signal and the pilot beat signal

656
Determine the noise-corrected phase signal as a difference between a phase of the first demodulated signal and a phase of the pilot beat signal.

658
Executing a blind phase search algorithm to determine the phase of the pilot beat signal

FIG. 6

OPTICAL FREQUENCY COMB BASED COHERENT PHASE RECOVERY SIMPLIFICATION

RELATED APPLICATIONS

This application is a continuation of U.S. patent application Ser. No. 17/225,067, filed Apr. 7, 2021, which application claims benefit of priority to U.S. Provisional Patent Application Ser. No. 63/006,200, filed on Apr. 7, 2020. The aforementioned applications are incorporated herein by reference in its entirety.

BACKGROUND

To accommodate high demands of up to multi-gigabit/s speed per user, coherent optical technology is considered a very promising solution for emerging data center interconnects (DCI) and optical edge/access networks due to its superior performance and vast potentials. Coherent optics offer superior receiver sensitivity that allows extended power budget and high frequency selectivity for dense wavelength division multiplexing (WDM) channels without requiring narrow-band optical filters. Moreover, the multi-dimensional signal recovered by coherent detection provides additional benefits to compensate linear transmission impairments such as chromatic dispersion (CD) and polarization mode dispersion (PMD) and efficiently utilizes the spectral resource, benefiting future network upgrades using multi-level advanced modulation formats.

Leveraging state-of-art complementary metal-oxide-semiconductor (CMOS) processing, reduction in design complexity and cost of opto-electronic components, coherent solutions are moving from long-haul and metro toward DCI and access networks. Although simplified coherent optics are being intensively researched, the cost is still the major hurdle for large scale deployments of coherent optics in short-haul networks, where the cost requirements are much more stringent compared to long-haul and metro. The overall cost of currently adopted coherent optics in long-haul systems has been dominated by complex optical and opto-electronic components such as high-performance tunable lasers and local-oscillators, high-speed modulators and digital signal processing (DSP) chips, polarization optics, etc.

SUMMARY OF THE EMBODIMENTS

Embodiments disclosed herein employ an optical frequency-comb source to replace large amount of high-cost tunable lasers to reduce the cost of coherent optical system for short-haul applications. A key advantage of using optical frequency comb is that the comb lines in all channels typically suffer from similar optical phase noise, which usually comes from random phase variations of semiconductor-based master light sources. Taking advantage of the phase coherence between channels in an optical frequency comb, coherent digital signal processing (DSP) can be simplified by reducing the workload of phase tracking. With the phase-noise correlation between channels, we propose a joint signal processing using optical frequency comb as signal carriers and also local oscillators in a second design, which will greatly reduce the complexity of the coherent system hardware and DSP for short-haul applications.

In a first aspect, a coherent phase recovery method is disclosed. The method includes producing, with a frequency-comb source, a frequency-comb signal that includes a pilot tone and a first optical tone differing in center wavelength from the pilot tone. The method also includes coherently modulating the first optical tone to yield a first modulated signal; interferometrically detecting the pilot tone to yield a pilot beat signal; coherently detecting the first modulated signal to yield a first demodulated signal; and determining a noise-corrected phase signal from a difference between the first demodulated signal and the pilot beat signal.

In a second aspect, a second coherent phase recovery method is disclosed. The method includes producing, with a transmit-side frequency-comb source, a first frequency-comb signal that includes a pilot tone and a first optical tone having a first center wavelength that differs from a pilot center wavelength of the pilot tone. The method also includes coherently modulating the first optical tone to yield a first modulated signal; and generating a second frequency-comb signal with a receive-side frequency-comb source driven by the pilot tone. The method also includes extracting, from the second frequency-comb signal, a first local-oscillator tone having the first center wavelength; and demodulating the first modulated signal by homodyning the first modulated signal with the first local-oscillator tone.

In a third aspect, a first coherent phase recovery system includes a frequency-comb source, a signal divider, a coherent modulator, a signal combiner, a signal divider, a coherent receiver, and a receiver. The frequency-comb source includes a transmit-side comb-output port and is configured to generate a frequency-comb signal that includes a pilot tone and a first optical tone. The first signal divider has (i) a first common port optically coupled to the transmit-side comb-output port, (ii) a first pilot port configured to output the pilot tone, and (iii) a first non-pilot port configured to output the first optical tone. The coherent modulator has (i) an input port optically coupled to the first non-pilot port and (ii) a modulator-output port. The signal combiner has (i) a second pilot port optically coupled to the first pilot port and (ii) a second non-pilot port optically coupled to the modulator-output port, and a second common port. The second signal divider has (i) a third common port optically coupled to the second common port, (ii) a third pilot port configured to output the pilot tone, and (iii) a third non-pilot port configured to output the first optical tone. The coherent receiver has a modulated-signal port optically coupled to the third non-pilot port. The receiver has (i) an input port optically coupled to the third pilot port.

In a fourth aspect, a second coherent phase recovery system includes a receive-side frequency-comb source, a coherent receiver, a first signal divider, and a second signal divider. The receive-side frequency-comb source has a comb-input port and a first comb-output port. The coherent receiver has a local-oscillator port and a modulated-signal port. The first signal divider has a first common port optically coupled to the first comb-output port, and a local-oscillator output port optically coupled to the local-oscillator port. The second signal divider has (i) a pilot port optically coupled to the comb-input port, and (ii) a non-pilot port optically coupled to the modulated-signal port of the coherent receiver.

BRIEF DESCRIPTION OF THE FIGURES

FIG. 6 is a flowchart illustrating a coherent phase recovery method, which may be implemented by the coherent phase recovery system of FIG. 4.

DETAILED DESCRIPTION OF THE EMBODIMENTS

Figures 1, 2:
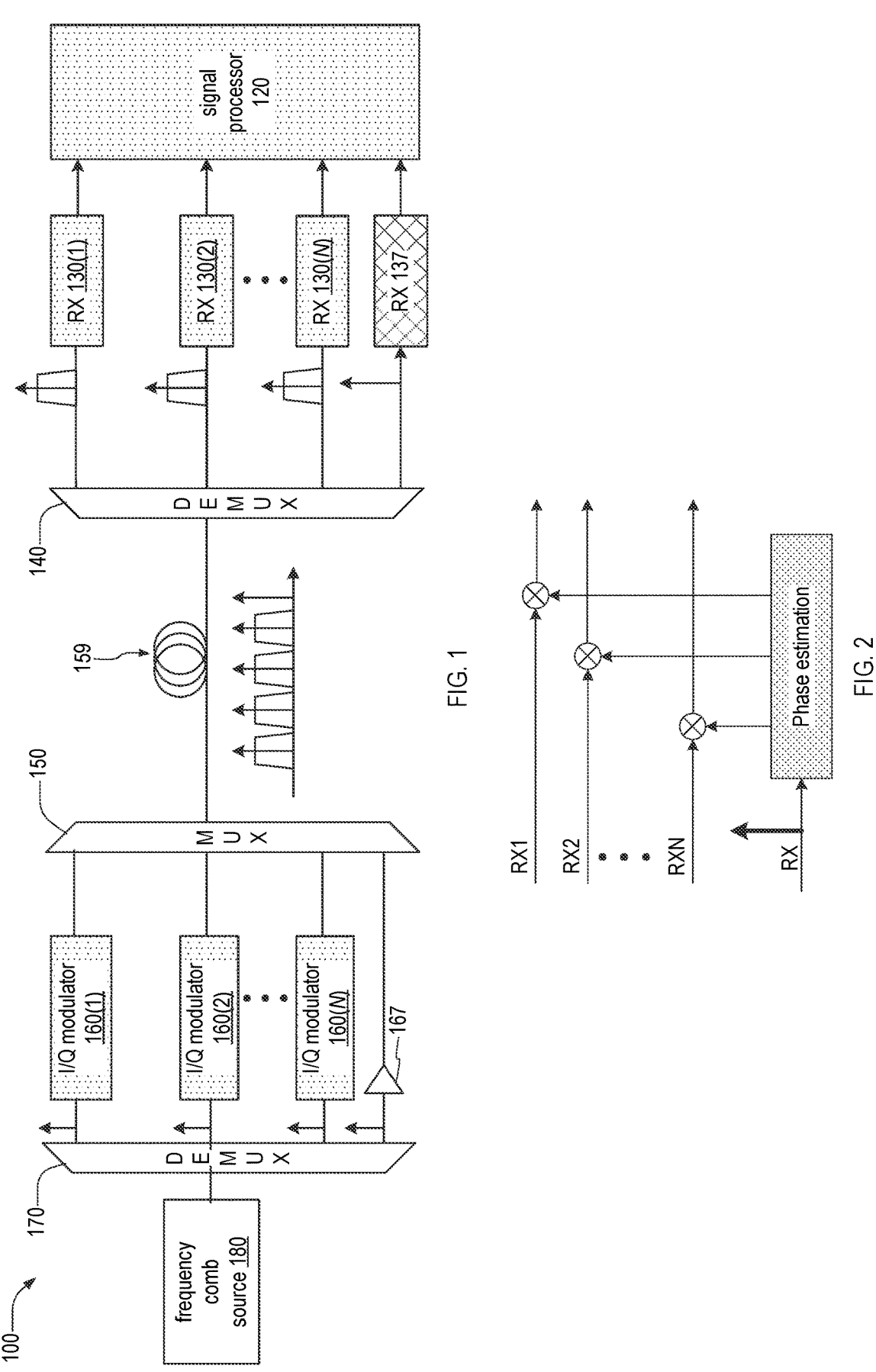
FIG. 1 is a schematic of a coherent optical transceiver, in an embodiment.
FIG. 2 is a schematic of a joint phase recovery method employed by the coherent optical transceiver of FIG. 1, in an embodiment.

FIG. 1 is a schematic of a coherent optical transceiver 100. Transceiver 100 includes an optical frequency-comb source 180. A WDM demultiplexer 170 is adopted to separate the comb lines from the optical frequency-comb source. After demultiplexer 170, each individual tone is sent into a respective coherent I/Q modulator 160 to generate signal, except a seed tone, which is amplified by a fiber amplifier 167. Fiber amplifier 167 may be a fiber amplifier, such as an erbium-doped fiber amplifier.

All modulated channels and the amplified seed tone are then combined via a WDM multiplexer 150 and transmitted downlink via an optical fiber link 159 to a demultiplexer 140. At the receiving side, each of the modulated channels are demultiplexed by demultiplexer 140 and demodulated by a respective coherent receiver 130, each of which transmit a demodulated signal to a signal processor 120. Similarly, demultiplexer 140 routes the seed tone to a receiver 137, which produces a pilot beat signal that is received by signal processor 120. With all the channels originating from same comb source and hence having the same phase noise, only one blind phase search processing is needed for all channels.

FIG. 2 is a schematic of a joint phase recovery method disclosed herein. Phase information estimated from the seed channel is reused to compensate the phase variations of other channels, to reduce the processing complexity of the receiver DSP.

Figure 3:
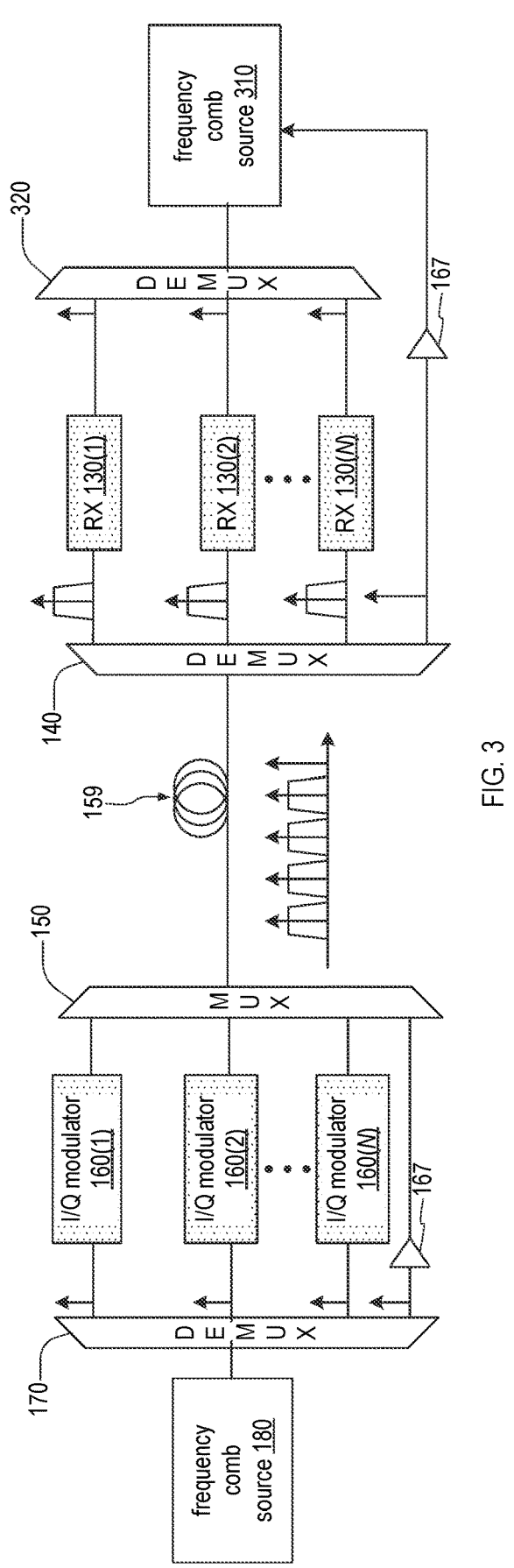
FIG. 3 is a schematic of an optical frequency comb-based transceiver, in an embodiment.

FIG. 3 is a schematic of an optical frequency comb-based transceiver 300. Transceiver 300's architecture enables a coherent phase recovery process that is similar to that of coherent optical transceiver 100. Output from optical frequency-comb source 180 is first demultiplexed via demultiplexer 170. All comb tones except a seed tone are then modulated by a respective coherent I/Q modulator 160. After being amplified by fiber amplifier 167, the seed tone is multiplexed with the modulated signals and sent down link via an optical fiber link 159 to demultiplexer 140, which demultiplexes the downlink signals and seed tone. The signals by coherent I/Q modulators 160(1–N) are sent into coherent receivers 130(1–N), respectively. The seed tone, which shares the same phase noise with other channels carrying the modulated signals, is then amplified by an optical amplifier 167 and sent to an optical frequency-comb source 310. The generated optical frequency comb is then demultiplexed by a demultiplexer 320 and used as local oscillator signals for coherent receivers 130(1–N). As the modulated signal and the local oscillator signal received by a respective coherent receiver 130 now share the same phase noise from the same master light source, phase recovery process can potentially be removed from the receiver DSP, thus the receiver DSP can be further simplified.

Figure 4:
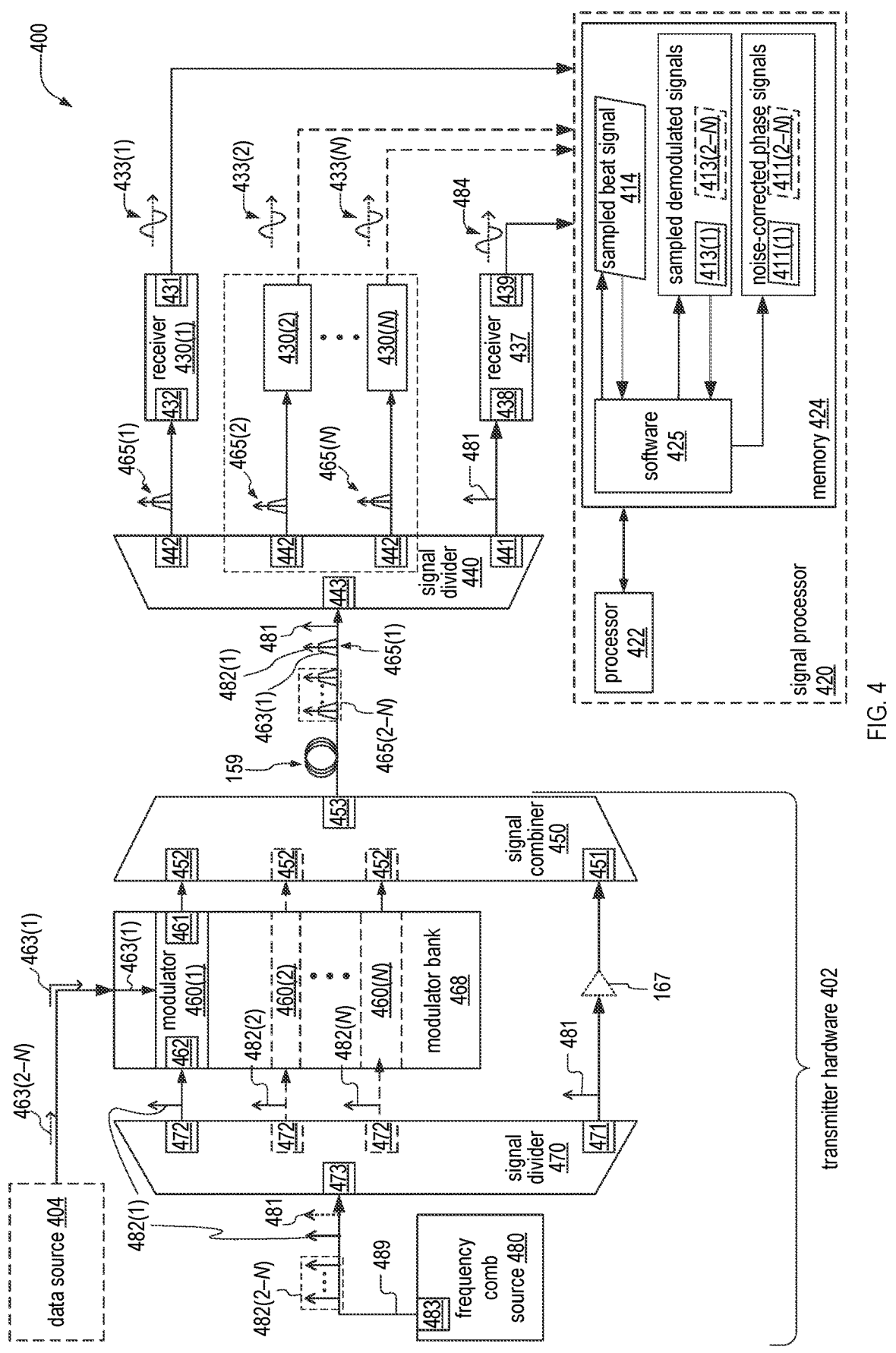
FIG. 4 is a schematic of a coherent phase recovery system, of which the coherent optical transceiver of FIG. 1 is an example.

FIG. 4 is a schematic of a coherent phase recovery system 400, hereinafter system 400, of which coherent optical transceiver 100 is an example. System 400 includes a frequency-comb source 480, a signal divider 470, a coherent modulator 460(1), a signal combiner 450, a signal divider 440, a coherent receiver 430(1), and a receiver 437. Frequency-comb source 180 is an example of frequency-comb source 480.

In embodiments, signal divider 440 is one of a 1-to-M fiber-optic coupler (M≥N) and a demultiplexer, signal combiner 450 is one of a 1-to-M fiber-optic coupler, a fiber-optic splitter/combiner, and a multiplexer, and signal divider 470 is one of a demultiplexer and a wavelength-selective switch. For example, in certain embodiments, each of signal dividers 470 and 440 is a demultiplexer, and signal combiner 450 is a multiplexer. In certain other embodiments, signal divider 470 is a wavelength-selective switch, and each of signal combiner 450 and signal dividers 440 is a 1-to-M fiber-optic coupler. Signal dividers 440, signal combiner 450, and signal dividers 470 include (i) respective pilot ports 441, 451, and 471, (ii) respective common ports 443, 453, and 473, and (iii) at least one non-pilot port 442, 452, and 472 respectively. Each non-pilot port 442, 452, and 472 is optically coupled to a respective common port 443, 453, and 473. In embodiments, two ports that are optically coupled are coupled with an optical fiber, such as a connectorized optical fiber.

Frequency-comb source 480 includes a transmit-side comb-output port 483. When operating, frequency-comb source 480 generates a frequency-comb signal 489 that includes a pilot tone 481 and an optical tone 482(1). In signal divider 470, common port 473 is optically coupled to comb-output port 483, pilot port 471 is configured to output pilot tone 481, and non-pilot port 472 is configured to output optical tone 482(1). Coherent modulator 460(1) has (i) an input port 462 optically coupled to non-pilot port 472 and (ii) a modulator-output port 461.

In signal divider 440, pilot port 441 is configured to output pilot tone 481, and non-pilot port 442 is configured to output the optical tone 482(1). Common port 443 of signal divider 440 is optically coupled to common port 453 of signal combiner 450 via optical fiber link 159. In signal combiner 450, pilot port 451 is optically coupled to pilot port 471, and non-pilot port 452 is optically coupled to modulator-output port 461. Coherent receiver 430(1) has a modulated-signal port 432 optically coupled to non-pilot port 442. Receiver 437 has an input port 438 optically coupled to pilot port 441. Receiver 437 is an example of receiver 137 and, in embodiments, receiver 437 is one of a product detector, a heterodyne detector, and a coherent receiver.

In embodiments, frequency-comb signal 489 includes additional optical tones 482(2–N) and system 400 includes additional modulators 460(2–N), and additional coherent receivers 430(2–N), where N≥2 is a positive integer. Modulators 460 may be part of a modulator bank 468.

In embodiments, system 400 includes a data source 404, which may be premises host equipment. Data source 404 produces at least one modulated signal 463(k) and is communicatively coupled to modulator 460(k), which modulates optical tone 482(k) with data signal 463(k) to produce a modulated signal 465(k), where channel index k is a positive integer less than or equal to N. The channel spacing of the frequency-comb signal 489 may be 25 GHZ, 50 GHz, 75

GHZ, etc., depending, for example, on the comb generation method and baud rate of modulated signal 463.

In embodiments, system 400 includes a signal processer 420 that is communicatively coupled to an output port 439 of receiver 437 and a respective output port 431 of at least one coherent receiver 430. Signal processor 420 is an example of signal processor 120, FIG. 1, and includes a processor 422 and a memory 424 communicatively coupled thereto. Memory 424 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 424 may be integrated into processor 422. Memory 424 includes software 425, which includes machine-readable instructions. Processor 422 is configured to execute the machine-readable instructions to perform functions of system 400. For at least one channel k, signal processor 420 samples demodulated signal 433(k) and stores the sampled signal as sampled demodulated signal 413(k) in memory 424. Signal processor 420 also samples pilot beat signal 484 and stores the sampled signal as sampled beat signal 414.

FIG. 4 denotes transmitter hardware 402, which includes frequency-comb source 480, signal divider 470, and signal combiner 450. When included in system 400, modulators 460(2-N) and data source 404 are part of transmitter hardware 402.

Figure 5:
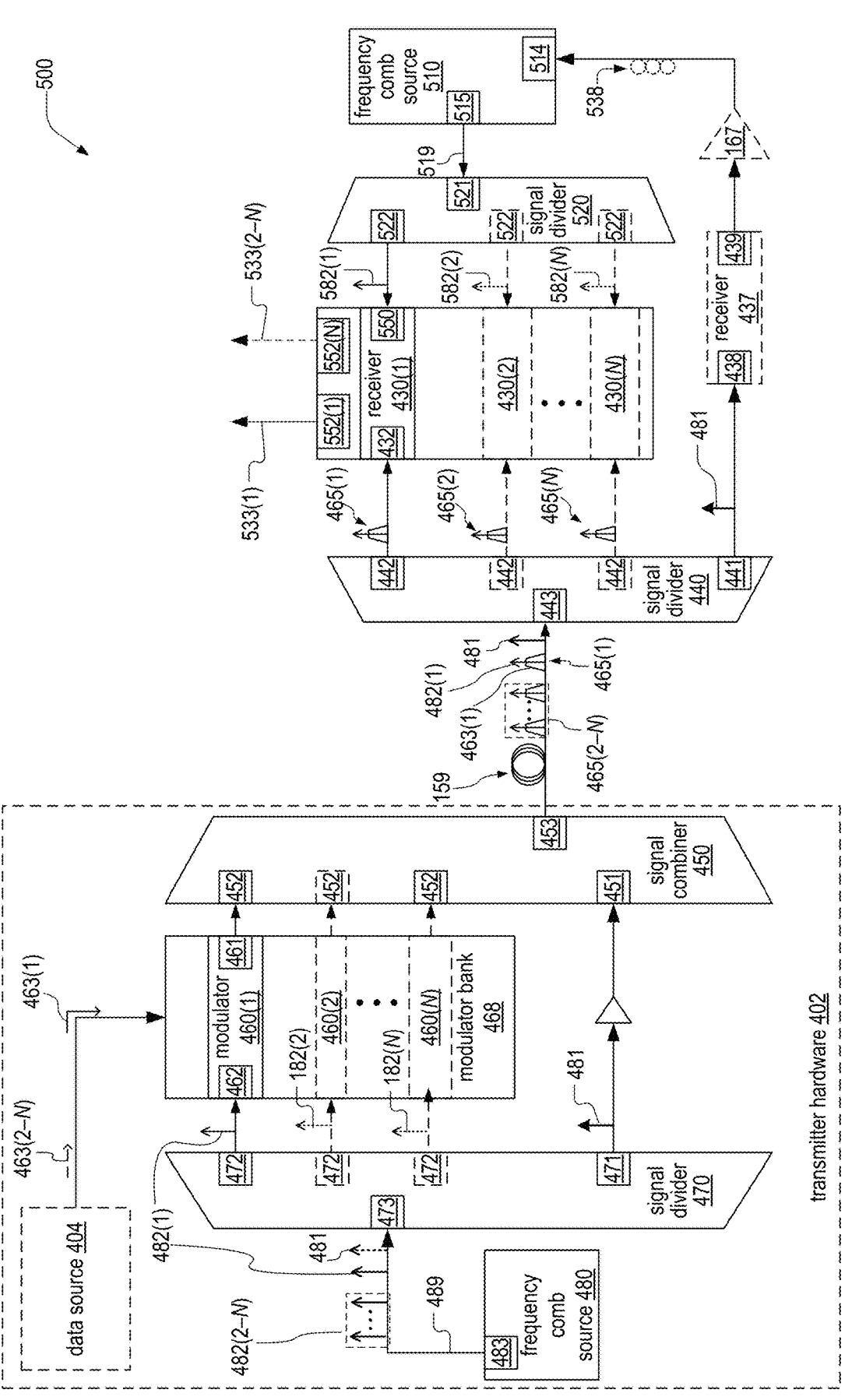
FIG. 5 is a schematic of a coherent phase recovery system, of which the coherent optical transceiver of FIG. 3 is an example.

FIG. 5 is a schematic of a coherent phase recovery system 500, hereinafter system 500, of which optical frequency comb-based receiver 300 is an example. System 500 includes a receive-side frequency-comb source 510, coherent receiver 430(1), a signal divider 520, and signal divider 440. Receive-side frequency-comb source 510 has a comb-input port 514 and a comb-output port 515. Signal divider 520 has a common port 521 optically coupled to comb-output port 515, and a local-oscillator output port 522 optically coupled to a local-oscillator port 550 of coherent receiver 430(1). Multiplexer 320 is an example of signal divider 520.

In embodiments, each of frequency-comb sources 480 and 510 includes one of an electro-optic modulator and phase-stabilized mode-locked laser. Each of frequency-comb sources 480 and 510 may generate an optical frequency comb via one of multiple different methods such as parametric frequency conversion, gain switched optical injection locking, electro-optic comb generation, etc.

Non-pilot port 442 of signal divider 440 is optically coupled to modulated-signal port 432 of coherent receiver 430(1). Pilot port 441 of signal divider 440 is optically coupled to comb-input port 514.

In embodiments, for example when signal divider 440 is a fiber-optic splitter, system 500 includes receiver 437. Receiver 437's input port 438 is optically coupled to pilot port 441, and receiver 437's output port 439 is optically coupled to comb-input port 514 of frequency-comb source 510.

In embodiments, system 500 includes an optical amplifier 167 optically coupled between output port 439 and comb-input port 514. In embodiments, system 500 includes a polarization controller 538 optically coupled between output port 439 and comb-input port 514.

In embodiments, at least one of signal dividers 440 and 520 is either a demultiplexer and a wavelength-selective switch. In embodiments, signal divider 440 is a demultiplexer and pilot port 441 is configured to output pilot tone

481, which has a pilot center wavelength. Non-pilot port 442 is configured to output modulated signal 465, which has a center wavelength that differs from the pilot center wavelength. Such embodiments of coherent phase recovery system 500 also include transmitter hardware 402.

In embodiments of system 500, signal divider 440 is a demultiplexer, signal combiner 450 is a multiplexer, and transmit-side signal divider 470 is one of a wavelength-selective switch and a demultiplexer. In such embodiments, pilot port 441 is configured to output pilot tone 481 having a pilot center wavelength, and non-pilot port 442 is configured to output modulated signal 465 having a first center wavelength that differs from the pilot center wavelength.

Figure 8:
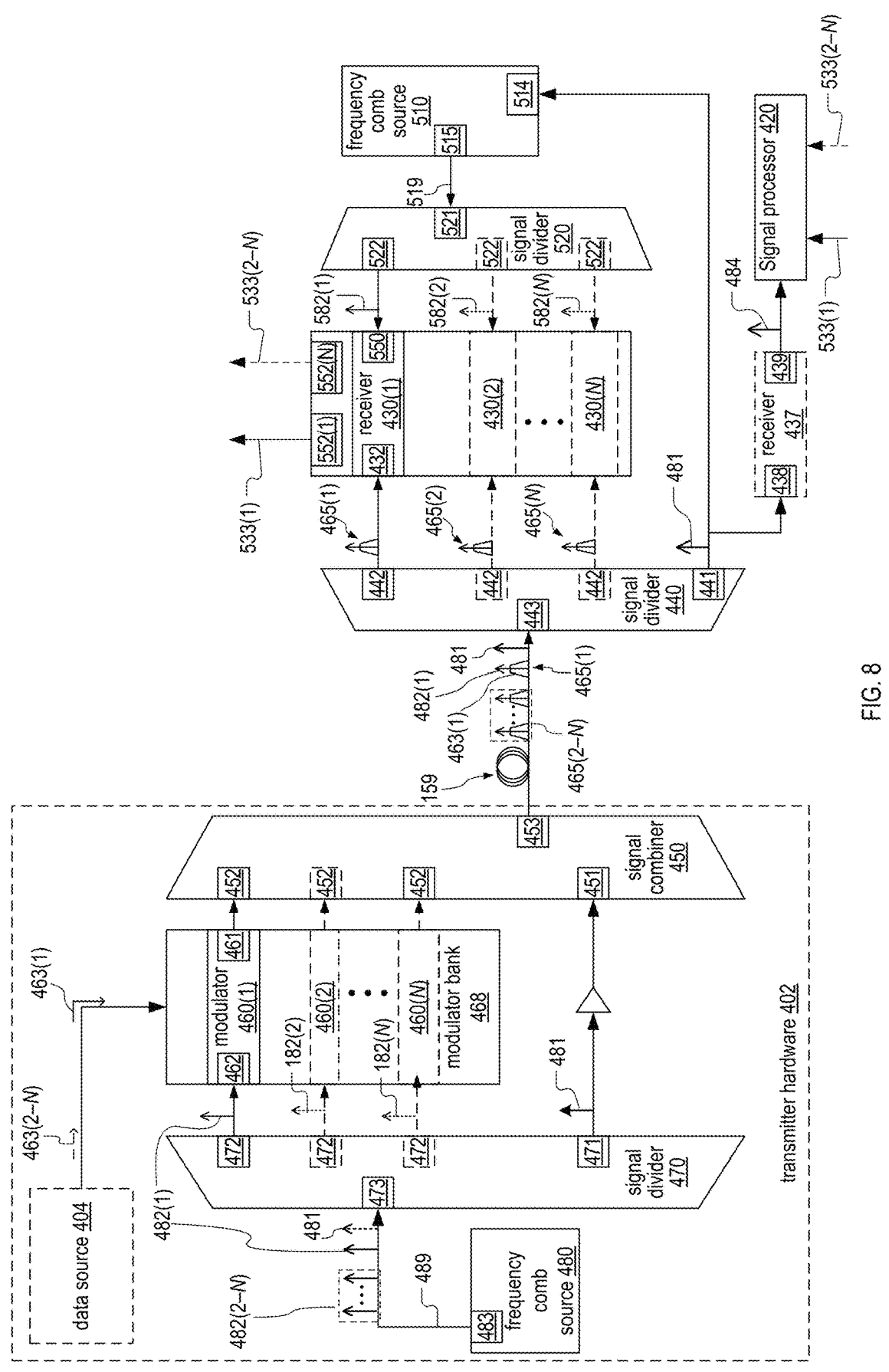
FIG. 8 is a schematic diagram of a coherent phase recovery system including a signal processor.

In embodiments, such as illustrated in FIG. 8, system 500 includes signal processer 420 that is communicatively coupled to output port 439 of receiver 437 and a respective output port 552 of at least one coherent receiver 430. Processor 422 is configured to execute the machine-readable instructions to perform functions of system 500. In embodiments, for at least one channel k, signal processor 420 samples demodulated signal 533(k) and stores the sampled signal as a sampled demodulated signal in memory 424. Signal processor 420 also samples pilot beat signal 484 and stores the sampled signal as sampled beat signal 414.

FIG. 6 is a flowchart illustrating a coherent phase recovery method 600. In embodiments, method 600 is implemented within one or more aspects of coherent phase recovery system 400. Method 600 includes steps 610, 620, 630, 640, and 650.

Step 610 includes producing, with a frequency-comb source, a frequency-comb signal that includes a pilot tone and a first optical tone differing in center wavelength from the pilot tone. In an example of step 610, frequency-comb source 480 produces frequency-comb signal 489, which includes pilot tone 481 and at least one optical tone 482(k), where channel index k is a positive integer less than or equal to N.

Step 620 includes coherently modulating the first optical tone to yield a first modulated signal. In example of step 620, for at least one channel k, modulator 460(k) coherently modulates optical tone 482(k) with data signal 463(k) to yield modulated signal 465(k).

Step 630 includes interferometrically detecting the pilot tone to yield a pilot beat signal. In an example of step 630, receiver 437 interferometrically detects pilot tone 481 to yield a pilot beat signal 484. In embodiments, step 630 includes detecting the pilot tone via one of coherent detection and self-heterodyning.

Step 640 includes coherently detecting the first modulated signal to yield a first demodulated signal. In an example of step 640, for at least one channel k, coherent receiver 430(k) coherently detects modulated signal 465(k) to yield demodulated signal 433(k).

Step 650 includes determining a noise-corrected phase signal from a difference between the first demodulated signal and the pilot beat signal. In embodiments, step 650 is implemented by processor 422 executing computer-readable instructions of software 425. In an example of step 650, for at least one channel k, signal processor 420 determines noise-corrected phase signal 411(k) from a difference between demodulated signal 433(k) and pilot beat signal 484.

In embodiments, step 650 includes step 652, which includes determining the noise-corrected phase signal as a phase of a difference between the first demodulated signal and the pilot beat signal. In an example of step 652, for at least one channel k, signal processor 420 determines noise-corrected phase signal 411($k$) as a phase of the difference between the demodulated signal 413($k$) and pilot beat signal 414. Step 652 may include step 654, which includes executing a blind phase search algorithm to determine the phase of the difference between the first demodulated signal and the pilot beat signal. In an example of step 654, signal processor 420 executes a blind phase search algorithm to determine the phase of the difference between demodulated signal 413($k$) and pilot beat signal 414.

In embodiments, step 650 includes step 656, which includes determining the noise-corrected phase signal as a difference between a phase of the first demodulated signal and a phase of the pilot beat signal. In an example of step 656, for at least one channel k, signal processor 420 determines noise-corrected phase signal 411($k$) as as a difference between a phase of demodulated signal 413($k$) and a phase of pilot beat signal 414. Step 656 may include step 658, which includes executing a blind phase search algorithm to determine the phase of the pilot beat signal. In an example of step 658, signal processor 420 executes a blind phase search algorithm to determine the phase of pilot beat signal 414.

Figure 7:
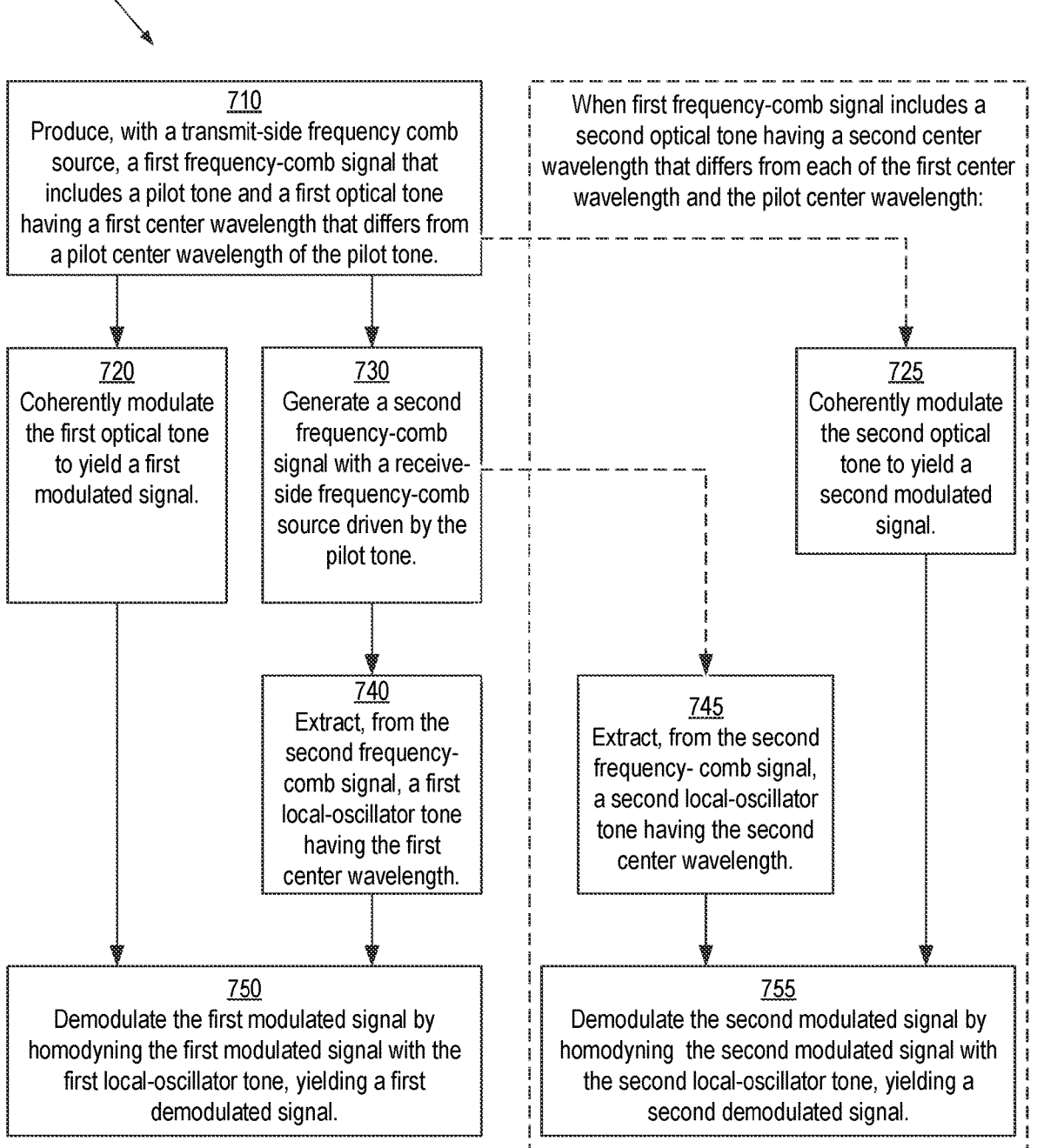
FIG. 7 is a flowchart illustrating a coherent phase recovery method, which may be implemented by the coherent phase recovery system of FIG. 5.

FIG. 7 is a flowchart illustrating a coherent phase recovery method 700. In embodiments, method 700 is implemented within one or more aspects of coherent phase recovery system 500. Method 700 includes steps 710, 720, 730, 740, and 750.

Step 710 includes producing, with a transmit-side frequency-comb source, a first frequency-comb signal that includes a pilot tone and a first optical tone having a first center wavelength that differs from a pilot center wavelength of the pilot tone. In an example of step 710, frequency-comb source 480 produces frequency-comb signal 489, which includes pilot tone 481 and at least one optical tone 482($k$), where channel index k is a positive integer less than or equal to N. Pilot tone 481 differs from a center wavelength and each of the at least one optical tones 482($k$) have different respective center wavelengths.

Step 720 includes coherently modulating the first optical tone to yield a first modulated signal. In example of step 720, for at least one channel k, e.g., k=1, modulator 460($k$) coherently modulates optical tone 482($k$) with data signal 463($k$) to yield modulated signal 465($k$).

Step 730 includes generating a second frequency-comb signal with a receive-side frequency-comb source driven by the pilot tone. In an example of step 730, frequency-comb source 510 is driven by pilot tone 481 and generates an optical-frequency-comb signal 519.

Step 740 includes extracting, from the second frequency-comb signal, a first optical tone having the first center wavelength. In an example of step 740, signal divider 520 extracts, for at least one channel k, e.g., k=1, a local-oscillator tone 582($k$) that has the same center wavelength as optical tone 482($k$). Optical tones 482($k$) and 582($k$) share the same phase noise, having both been generated by the same master light source of frequency-comb source 480.

Step 750 includes demodulating the first modulated signal by homodyning the first modulated signal with the first local-oscillator tone. In an example of step 750, for at least one channel k, e.g., k=1, coherent receiver 430($k$) demodulates modulated signal 465($k$) by homodyning modulated signal 465($k$) with local-oscillator tone 582($k$). The phase of at least one resulting demodulated signal 533($k$), e.g., k=1, is already compensated for the phase noise of pilot tone 481, such that the signal processing of method 600's step 650 is not required.

In embodiments, method 700 includes steps 725, 745, and 755 when the first frequency-comb signal includes a second optical tone having a second center wavelength that differs from each of the first center wavelength and the pilot center wavelength.

Step 725 includes coherently modulating the second optical tone to yield a second modulated signal. In example of step 725, for at least one channel k, e.g., k=2, modulator 460($k$) coherently modulates optical tone 482($k$) with data signal 463($k$) to yield modulated signal 465($k$).

Step 745 includes extracting, from the second frequency-comb signal, a second optical tone having the second center wavelength. In an example of step 745, signal divider 520 extracts, for at least one channel k, e.g., k=2, a local-oscillator tone 582($k$) that has the same center wavelength as optical tone 482($k$).

Step 755 includes demodulating the second modulated signal by homodyning the second modulated signal with the second local-oscillator tone. In an example of step 755, for at least one channel k, e.g., k=2, coherent receiver 430($k$) demodulates modulated signal 465($k$) by homodyning modulated signal 465($k$) with local-oscillator tone 582($k$). The phase of at least one resulting demodulated signal 533($k$), e.g., k=2, is already compensated for the phase noise of pilot tone 481, such that the signal processing of method 600's step 650 is not required.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A coherent phase recovery method, the method comprising:

producing, with a transmit-side frequency-comb source, a first frequency-comb signal that includes a pilot tone and a first optical tone having a first center wavelength that differs from a pilot center wavelength of the pilot tone;

coherently modulating the first optical tone to yield a first modulated signal;

generating a second frequency-comb signal with a receive-side frequency-comb source driven by the pilot tone;

extracting, from the second frequency-comb signal, a first local-oscillator tone having the first center wavelength;

demodulating the first modulated signal using the first local-oscillator tone to obtain a first demodulated signal;

generating a pilot beat signal from the pilot tone with a pilot-tone receiver; and determining a noise-corrected phase signal from a difference between the first demodulated signal and the pilot beat signal.

2. The method of claim 1, the first frequency-comb signal further including a second optical tone having a second center wavelength that differs from each of the first center wavelength and the pilot center wavelength, and the method further comprising:

coherently modulating the second optical tone to yield a second modulated signal;

extracting, from the second frequency-comb signal, a second local-oscillator tone having the second center wavelength; and demodulating the second modulated signal using the second local-oscillator tone.

3. The method of claim 2, wherein demodulating the second modulated signal using the second local-oscillator tone comprises demodulating the second modulated signal by homodyning the second modulated signal with the second local-oscillator tone.

4. The method of claim 1, wherein extracting, from the second frequency-comb signal, the first local-oscillator tone comprises demultiplexing the second frequency-comb signal to produce a plurality of local-oscillator tones that includes the first local-oscillator tone.

5. The method of claim 1, wherein demodulating the first modulated signal using the first local-oscillator tone comprises demodulating the first modulated signal by homodyning the first modulated signal with the first local-oscillator tone.

6. A coherent phase recovery system, comprising:

a first frequency-comb source including a transmit-side comb-output port and being configured to generate a first frequency-comb signal that includes a pilot tone and a first optical tone;

a first signal divider having (i) a first common port optically coupled to the transmit-side comb-output port, (ii) a first pilot port configured to output the pilot tone, and (iii) a first non-pilot port configured to output the first optical tone;

a coherent modulator having (i) an input port optically coupled to the first non-pilot port and (ii) a modulator-output port;

a signal combiner having (i) a second pilot port optically coupled to the first pilot port, (ii) a second non-pilot port optically coupled to the modulator-output port, and (iii) a second common port;

a second signal divider having (i) a third common port optically coupled to the second common port, (ii) a third pilot port configured to output the pilot tone, and (iii) a third non-pilot port configured to output the first optical tone;

a coherent receiver having a modulated-signal port optically coupled to the third non-pilot port;

a pilot-tone receiver having an input port optically coupled to the third pilot port;

a second frequency-comb source configured to generate a second frequency-comb signal from an output of the third pilot port of the second signal divider;

a third signal divider configured to extract, from the second frequency-comb signal, a first local-oscillator tone for use by the coherent receiver; and a signal processor communicatively coupled to each of (i) the output of the pilot-tone receiver and (ii) an output port of the coherent receiver, the signal processor being configured to determine a noise-corrected phase signal from a difference between a demodulated signal from the output port of the coherent receiver and a pilot beat signal from the output of pilot-tone receiver.

7. The system of claim 6, further comprising an optical fiber link communicatively coupling the second common port and the third common port.

8. The system of claim 6, further comprising a polarization controller optically coupled to the third pilot port of the second signal divider.

9. The system of claim 6, further comprising an amplifier optically coupled between the third pilot port of the second signal divider and the second frequency-comb source.

10. A coherent phase recovery system, comprising:

a receive-side frequency-comb source having a comb-input port and a first comb-output port;

a coherent receiver having a local-oscillator port, a modulated-signal port, and an output port;

a first signal divider having a first common port optically coupled to the first comb-output port, and a local-oscillator output port optically coupled to the local-oscillator port;

a second signal divider having (i) a pilot port optically coupled to the comb-input port, and (ii) a non-pilot port optically coupled to the modulated-signal port of the coherent receiver;

a pilot-tone receiver communicatively coupled to the pilot port of the second signal divider; and a signal processor communicatively coupled to each of (i) an output port of the pilot-tone receiver and (ii) the output port of the coherent receiver, the signal processor being configured to determine a noise-corrected phase signal from a difference between a demodulated signal from the output port of the coherent receiver and a pilot beat signal from the output port of pilot-tone receiver.

11. The system of claim 10, the first signal divider being one of a demultiplexer and a wavelength-selective switch, and the second signal divider being one of a demultiplexer and a wavelength-selective switch.

12. The system of claim 10, further comprising:

a signal combiner having a common combiner-port optically coupled to a second common port of the second signal divider;

a transmit-side frequency-comb source configured to generate a frequency-comb signal having a frequency-comb spectrum that includes a pilot tone and a first optical tone; and a transmit-side signal divider having (i) a transmit-side multiplexed port optically coupled to a transmit-side comb-output port of the transmit-side frequency-comb source, (ii) a pilot demultiplexed port optically coupled to the transmit-side multiplexed port and configured to output the pilot tone, and (iii) a non-pilot multiplexed port optically coupled to the transmit-side multiplexed port and configured to output the first optical tone.

13. The system of claim 12, the second signal divider being a demultiplexer;

the signal combiner being a multiplexer; and the transmit-side signal divider being one of a wavelength-selective switch and a demultiplexer.

14. The system of claim 12, further comprising a coherent modulator having (i) an input port optically coupled to the non-pilot multiplexed port and (ii) an output port optically coupled to the signal combiner.

15. The system of claim 12, further comprising an optical fiber link communicatively coupling the common combiner-port to the second common port of the second signal divider.

16. The system of claim 12, further comprising an amplifier optically coupled between the pilot demultiplexed port and the signal combiner.

17. The system of claim 10, further comprising a polarization controller optically coupled between the pilot port of the second signal divider and the comb-input port.

18. The system of claim 10, the pilot port being configured to output a pilot tone having a pilot center wavelength, and the non-pilot port being configured to output a first optical tone having a first center wavelength that differs from the pilot center wavelength.

19. The system of claim 10, further comprising further comprising an amplifier optically coupled between the pilot port of the second signal divider and the comb-input port.

* * * * *